Dec. 25, 1956     J. B. BRASWELL ET AL     2,775,480
DUMPING MECHANISM FOR SEMITRAILERS
Filed June 1, 1953     3 Sheets-Sheet 1
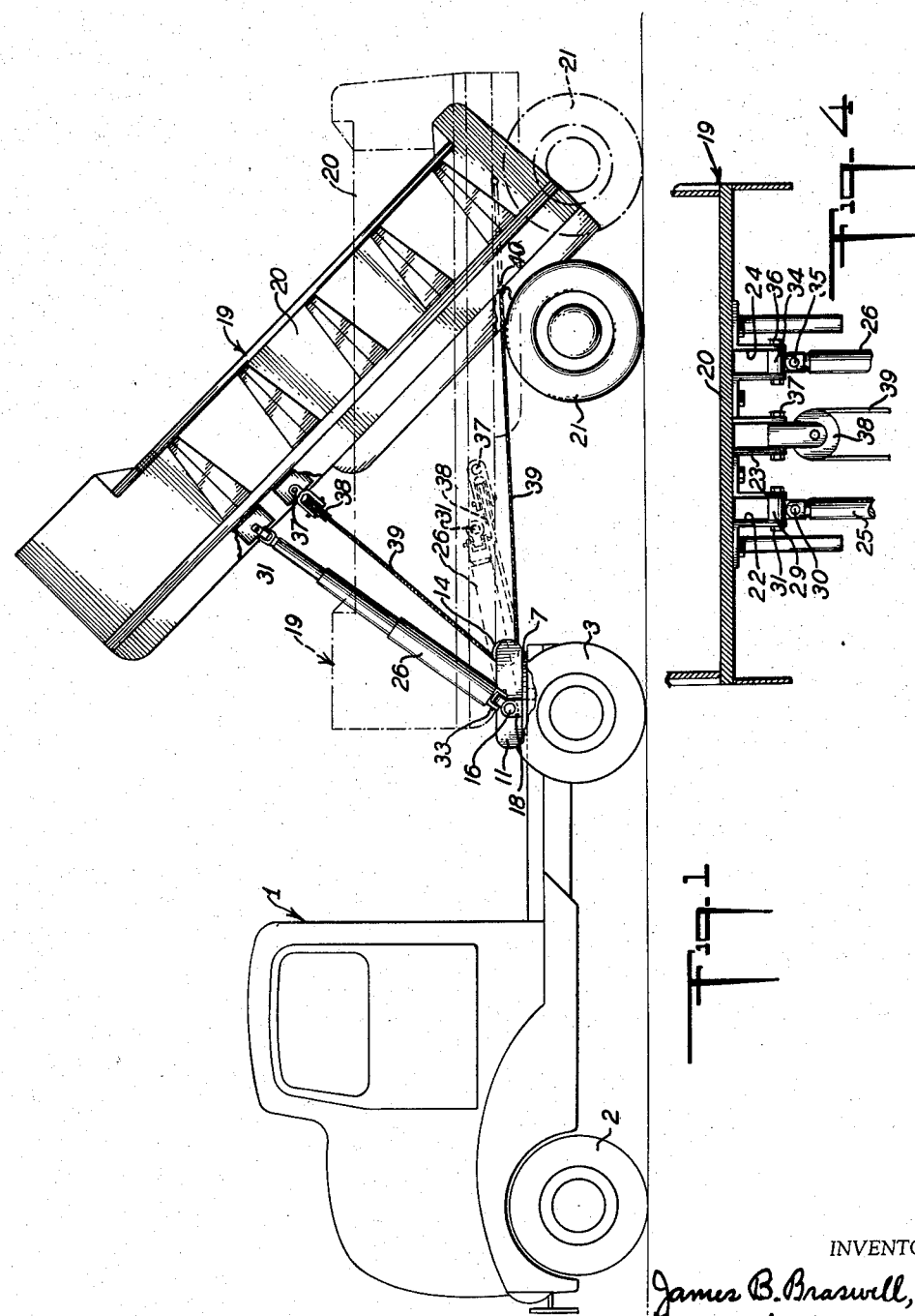
INVENTORS
James B. Braswell,
Frank L. Clement,
BY Smith, Michael & Gardiner,
ATTORNEYS.

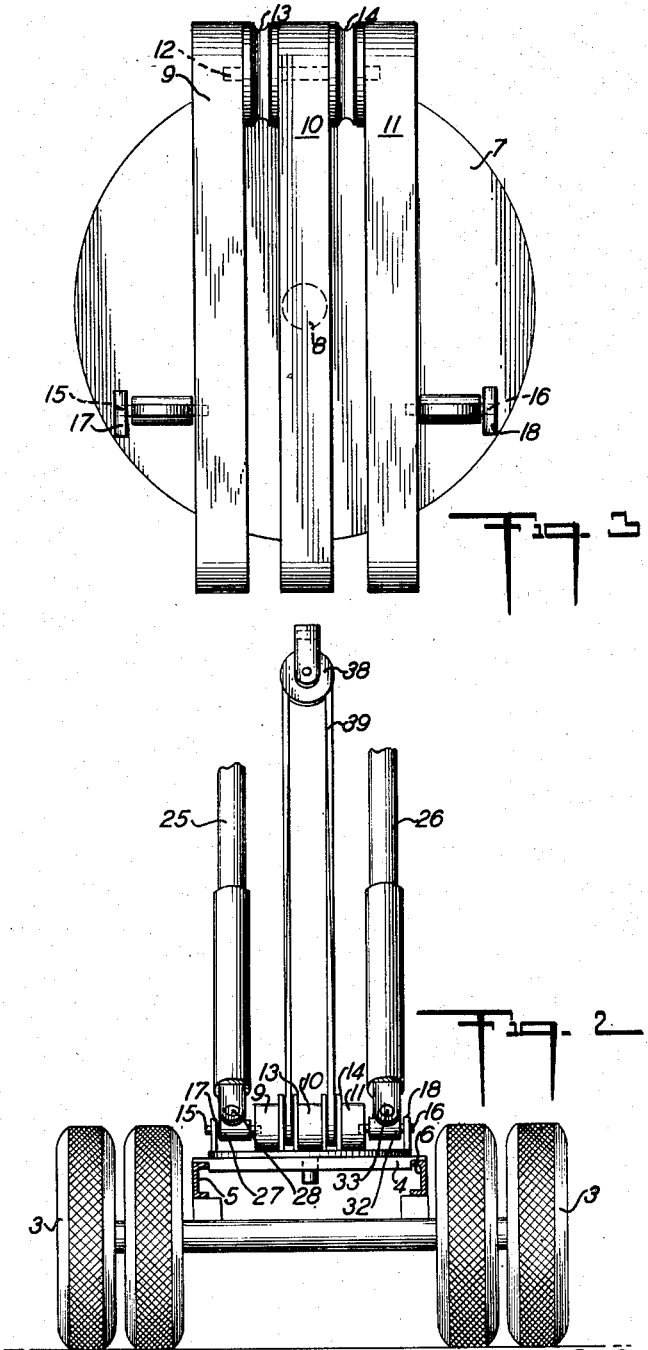

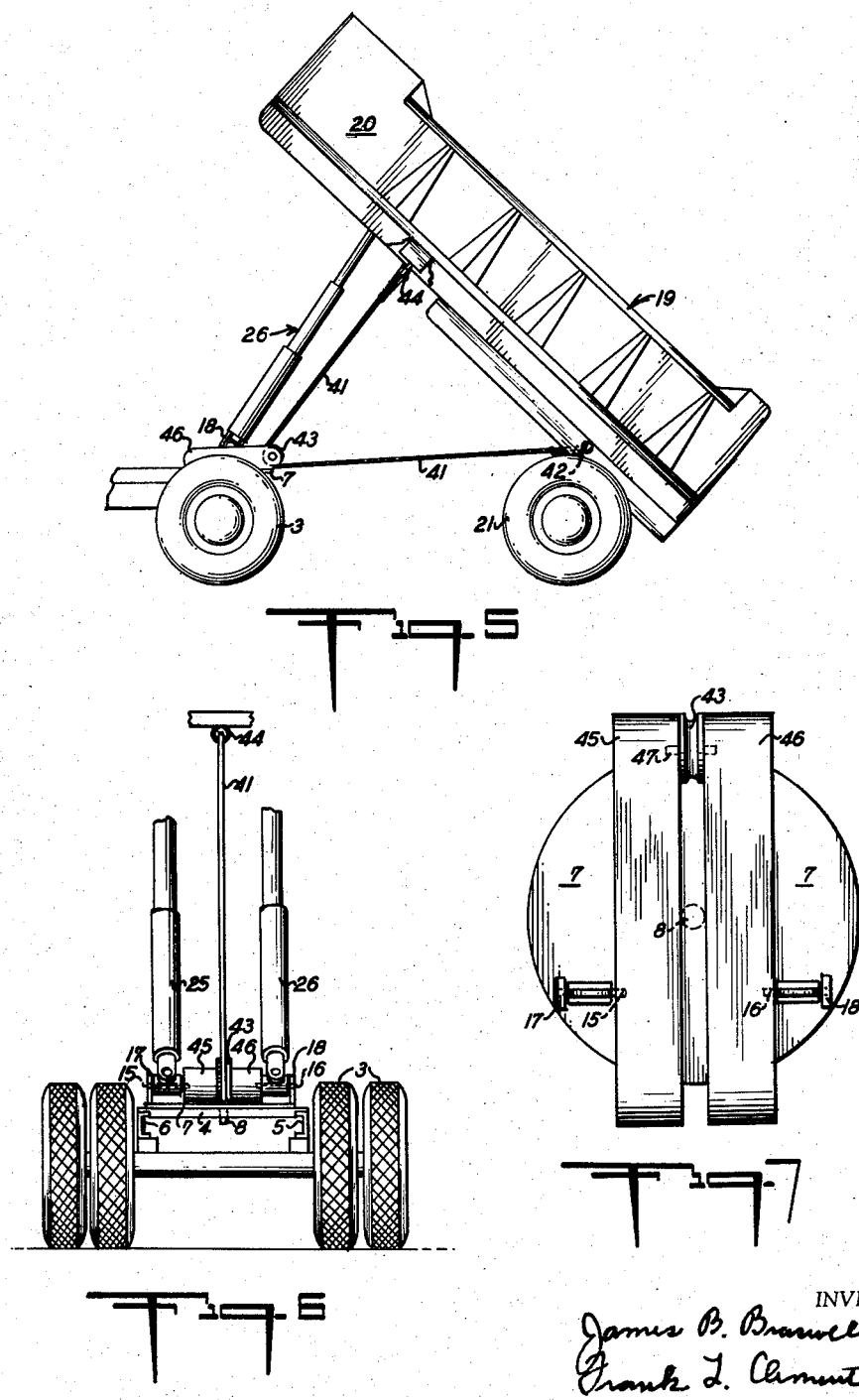

United States Patent Office 2,775,480
Patented Dec. 25, 1956

2,775,480

DUMPING MECHANISM FOR SEMITRAILERS

James B. Braswell and Frank L. Clement, Minden, La.

Application June 1, 1953, Serial No. 358,638

7 Claims. (Cl. 298—19)

Our present invention relates to dumping mechanism for semitrailers and has particular reference to a tractor-trailer combination including power-actuated means for simultaneously lifting the forward end of a trailer and drawing the rear wheels thereof toward the rear wheels of the associated tractor to effect maximum tilting of the trailer to dumping position.

Numerous patents have been granted on tractor-trailer combinations in which mechanism is provided for lifting the forward end of the trailer to a position above its normal level and simultaneously drawing the rear wheels of the associated trailer forwardly toward the rear wheels of the tractor as the trailer is moved toward and to dumping position. In such prior art devices, it is customary to employ a power winch or its equivalent mechanism, operative upon the cable of a cable system and effective through the cable to draw the rear wheels of the trailer forwardly toward the rear wheels of the tractor as the cable is wound upon the drum of the power winch, suitable pivotally mounted thrust rods or the like being provided to extend between the tractor and the front end portion of the trailer to support said front end as the trailer is moved or tilted into dumping position. Other prior art devices of this general character include the provision, in a tractor-trailer combination, of fluid-pressure operated power jacks, rack and pinion devices, or the like power operated mechanisms, for elevating the forward end of the trailer above its normal position to effect tilting of the trailer into dumping position. Other prior art devices of this general character involve a combination of power-actuated means to elevate the forward end of the trailer above its normal position and power-actuated means, such as a winch, effective upon the cable of a cable system to draw the rear wheels of the trailer forwardly toward the rear wheels of the tractor simultaneously with the elevation of the forward end of the trailer. While many of the prior art devices have been afforded some degree of commercial success, such devices are not entirely satisfactory or entirely efficient in the purposes for which designed, due to the comparatively complicated and costly mechanisms employed, the difficulties of manufacture, installation, upkeep, and repair, etc. The art relating to tractor-trailer combinations has long sought to provide a simple and effective means for elevating the forward end of a trailer and simultaneously moving the rear end thereof forwardly toward the tractor.

As the forward end of a trailer is elevated with respect to the rear end of its associated tractor, the vertical distance between said forward end and said rear end of the tractor will gradually increase, as the trailer moves from its normal horizontal position toward its maximum tilted or dumping position, and it is an object of our present invention to utilize this gradual increase in distance to draw the rear wheels of the trailer toward the rear wheels of the tractor simultaneously with the elevation of the front end of the trailer and without the employment of additional power-actuated mechanism such as a winch or the like.

It is an object of our present invention to provide a power-actuated mechanism for elevating the forward end of a trailer of a tractor-trailer combination, and to associate with the tractor and trailer a cable system by means of which the rear wheels of the trailer are moved forwardly toward the rear wheels of the associated tractor simultaneously with the elevation of the front end of the trailer toward and to the maximum tilting or dumping position of said trailer.

It is a further object of our present invention to provide a fluid-pressure operated jack or jacks extending between the tractor and the front end portion of the trailer and operable to an extended position to lift or elevate the front end portion of the trailer above its normal horizontal position, and to provide a cable system including pulleys mounted on the tractor and on the trailer with a cable passing around said pulleys with its ends secured to the trailer at the rear portion thereof, the arrangement being such that elevation of the forward end portion of the trailer will simultaneously cause the cable to draw or pull the rear wheels of the trailer forwardly toward the rear wheels of the associated tractor to effect rapid tilting and dumping of the trailer.

It is a still further object of my present invention to provide a dumping device of the character above described which does not require a power-operated winch or like power operated mechanism for drawing or pulling the rear of the trailer forwardly toward the rear of the associated tractor, and which device is simple and easy, as well as economical, to manufacture, install and operate, is strong and durable, and is highly satisfactory and efficient in the purposes for which designed.

In the accompanying drawings, wherein for the purpose of illustration, we have shown a preferred embodiment of our present invention, Figure 1 is a side elevation of a tractor-trailer combination illustrating our present invention incorporated therein, this figure showing in dotted lines the normal, substantially horizontal position of the trailer with respect to the tractor, and showing in full lines the position of the trailer with respect to the tractor when the trailer has been moved to its fully tilted, dumping position, Figure 2 is an enlarged, fragmentary, transverse vertical view showing portions of the operating mechanism as viewed from the cab of the tractor when looking toward the underside of the elevated trailer, Figure 3 is an enlarged plan view of the platform which is rotatably mounted on the fifth wheel of the tractor, showing the means for pivotally mounting the lower ends of the fluid-pressure operated jacks and for rotatably mounting the pulleys over which the cable passes, Figure 4 is a fragmentary, transverse, vertical view, partly in section, showing the means for pivotally connecting the upper ends of the fluid-pressure operated elevating means and one of the pulleys of the cable system to the underside of the trailer body near the front end thereof, Figure 5 is a fragmentary side elevation of a tractor-trailer combination as illustrated in Figure 1, showing a single length of cable having one end rigidly attached to the rear portion of the trailer body, passing around a single pulley located at the rear of the tractor, and having its other end rigidly attached to the underside of the trailer body near the front end portion thereof, Figure 6 is an enlarged, fragmentary, transverse sectional view corresponding to Figure 2 and further illustrating the cable arrangement and associated structural details shown in Figure 5, and Figure 7 is an enlarged plan view of the platform illustrated in Figure 3 and showing the structural details of such a platform when employed with the cable arrangement shown in Figure 5.

Referring more in detail to Figures 1 through 4 of the accompanying drawings, wherein like reference numerals have been employed to designate like parts throughout the several views, the numeral 1 designates, broadly, a tractor of any desired or preferred construction, including the usual front steering wheels 2 and rear wheels 3, together with the usual motor, transmission, differential, and other conventional mechanism for driving and steering the tractor. The tractor per se forms no part of our present invention. As is the usual practice, the tractor is provided near the rear end thereof with a flat disk 4 having a centrally-located aperture therein, this disk being welded or otherwise rigidly secured to the main side chassis frames 5 and 6 of the tractor, and constituting, in effect, the fifth wheel of the tractor.

A flat disk-like member 7 is provided, which member corresponds substantially in diameter to the diameter of flat disk 4 mounted on the tractor, disk-like member 7 having a centrally-positioned depending stud 8 adapted to pass through the centrally-located aperture in flat disk 4 whereby member 7 is rotatably mounted on, and is supported by, said member 4, the depending stud 8 constituting, in effect the king pin of the tractor-trailer combination. Rigidly mounted on the upper surface of flat disk-like member 7 are three elongated members 9, 10 and 11 arranged in parallel, spaced relation, with the intermediate member 10 disposed along the diameter of the said disk-like member, all as best shown in Figure 3 of the accompanying drawings. A transversely disposed stub-shaft 12 passes completely through the rear portion of member 10 and has its opposite ends journalled in openings extending into the opposed faces of members 9 and 11, this stub-shaft rotatably mounting thereon a pair of spaced pulleys 13 and 14, with pulley 13 positioned between the members 9 and 10 and with pulley 14 positioned between members 10 and 11. Near the forward ends of members 9 and 11, we provide laterally-extending stub-shafts 15 and 16 having their inner ends journalled in openings extending into the outer side faces of members 9 and 11 and having their outer ends journalled in openings provided in brackets 17 and 18 welded or otherwise rigidly secured to the upper surface of disk-like member 7. It will thus be readily apparent that members 9, 10 and 11, pulleys 13 and 14 and stub-shafts 15 and 16 are rigidly secured to the upper surface of disk-like member 7 and are movable therewith as said member rotates about the axis of depending stud 8.

The semitrailer of the tractor-trailer combination of our present invention, is designated, broadly, by the reference numeral 19, and may be of any desired or preferred construction including a trailer body 20 of generally box-like construction with a tail gate at the rear end thereof. The trailer 19 includes the usual rear axle and rear, ground-engaging wheels 21 rotatably mounted on said axle at opposite ends thereof. The trailer per se forms no part of our present invention.

On the underside of the floor of the trailer body 20, we rigidly secure three spaced depending brackets 22, 23 and 24, these brackets being disposed transversely of the underside of the floor of the trailer body 20 and being so spaced that brackets 22, 23 and 24 overlie stub-shaft 15, centrally-positioned member 10, and stub-shaft 16, respectively, bracket 23 being positioned slightly toward the rear of the trailer body 20 with respect to brackets 22 and 24, which last-mentioned brackets are positioned in alinement transverse of the underside of the floor of the trailer body 20, all as best shown in Figure 1 of the accompanying drawings.

As a preferred means for elevating the forward end of the trailer from its normal, substantially horizontal position shown in dotted lines in Figure 1 to its elevated, fully tilted, dumping position shown in full lines in said figure, preferably we provide a pair of fluid-pressure actuated power jacks 25 and 26 of the telescoping piston type, these jacks having their power cylinders connected to a source of fluid-pressure through suitable manually-operable valve controlling mechanisms of any desired or preferred construction. Such jacks and the control mechanisms thereof are old and well known in the art, and, per se, form no part of our present invention, in view of which, the source of fluid pressure and the control mechanisms for said jacks have not been included in the disclosures of the accompanying drawings. The lower end of jack 25 is pivotally connected to a sleeve 27 by means of a pivot pin 28 which extends transversely of the length of said sleeve 27, and the said sleeve 27 is pivotally mounted on stub-shaft 15. The upper end of jack 25 is pivotally connected to a sleeve 29 by means of a pivot pin 30 which extends transversely of the length of said sleeve 29, and the said sleeve 29 is pivotally mounted on a pivot pin 31 extending between the spaced parallel arms of bracket 22. The lower end of jack 26 is pivotally connected to a sleeve 32 by means of a pivot pin 33 which extends transversely of the length of said sleeve 32, and the said sleeve 32 is pivotally mounted on stub-shaft 16. The upper end of jack 26 is pivotally connected to a sleeve 34 by means of a pivot pin 35 which extends transversely of the length of said sleeves 34, and the said sleeve 34 is pivotally mounted on a pivot pin 36 extending between the spaced parallel arms of bracket 24.

The bracket 23 has a pivot pin 37 extending between the spaced parallel arms thereof, on which pin we pivotally mount a pulley 38 for a purpose to be hereinafter described.

The cable system of the tractor-trailer combination of our present invention as illustrated in Figures 1 through 4 of the accompanying drawing, comprises a cable 39 having one of its ends rigidly attached to the underside of the trailer body 20 near the rear end thereof as shown at 40. The cable 39 passes forwardly from its point of attachment 40 toward the front of the trailer, then underneath and around pulley 14, then over and around pulley 38, then around and underneath pulley 13, and then rearwardly to a point on the underside of the trailer body near the rear thereof and directly opposite the point of attachment 40, where said last-mentioned end is rigidly attached to the underside of the trailer body 20.

The form of our invention illustrated in Figures 5 through 7 of the accompanying drawings differs from the form shown in Figures 1 through 4 merely in the particular cable systems employed. As clearly illustrated in Figures 5 through 7, the cable 41 has one end rigidly attached to an eye or like connector 42 bolted, welded, or otherwise rigidly attached to the underside of the trailer body near the rear portion of said body and at a point about midway between the sides thereof. Cable 41 passes forwardly from its point of attachment with eye or connector 42, then underneath and around pulley 43, and then upwardly where its forward end is rigidly attached to the underside of the trailer body by means of an eye or like connector 44 bolted, welded, or otherwise rigidly attached to the underside of the trailer body at a point about midway between the sides thereof.

The employment of the cable system just described necessitates a slight modification of the apparatus mounted on the flat disk-like member 7, this modification being clearly illustrated in Figures 6 and 7 of the accompanying drawings. All corresponding parts in Figures 2 and 3 and in Figures 6 and 7, respectively, bear the same reference numerals. To provide for the single pulley employed in the form of the invention shown in Figure 5, the flat, disk-like member 7 has mounted on its upper surface two elongated members 45 and 46 arranged in parallel spaced relation, as best shown in Figure 7. A transversely disposed stub-shaft 47 has its ends journaled in openings extending into the opposed faces of members 45 and 46, this stub-shaft 47 rotatably mounting thereon the pulley 43 positioned between members 45 and 46. It will thus be obvious that members 45 and 46, pulley 43, and stub-shaft 47 are all rigidly secured to the upper surface of disk-like member 7 and are movable therewith as said member rotates about the axis of depending stud 8.

From the foregoing detailed description of construction, it is believed that the operation of the forms of the tractor-trailer combination of our present invention will be readily apparent to anyone reasonably skilled in the art to which our invention relates. Suffice it to say that when fluid-pressure, such as hydraulic or pneumatic pressure is applied to power actuated jacks 25 and 26 by operation of suitable control valves, such fluid pressure entering the telescoping power-actuated jacks will cause said jacks to extend axially which will cause the forward end of the trailer body to be moved from its normal, substantially horizontal position shown in dotted lines in Figure 1 toward its fully tilted, dumping position shown in full lines in said figure. As the forward end of the trailer body 20 is elevated, the vertical distance between the rear end of the tractor and the forward end portion of said trailer body gradually increases, and the same is true of the vertical distance between the pulleys 13 and 14 and pulley 38. Hence, it will be readily apparent that the cable system of our present invention will be effective to pull or draw the rear end portion of the trailer body forwardly toward the rear wheels of the tractor, the cable length between pulleys 13 and 14 and pulley 38 gradually increasing, and the length of cable between pulleys 13 and 14 and the points of rigid attachment of the ends of the cable to the rear portion of the trailer body 20 gradually decreasing. The operation of the structure illustrated in Figures 5, 6 and 7, will, it is believed, be obvious from the foregoing description of the operation of the structure shown in Figures 1 through 4. As the forward end of the trailer body 20 is elevated, the vertical distance between the rear end of the tractor and the forward end portion of the trailer body gradually increases, and the same is true of the vertical distance between pulley 43 and the point of attachment 44. Hence it will be readily apparent that the cable system of this form of our invention will be effective to pull or draw the rear end portion of the trailer body forwardly toward the rear wheels of the trailer, the cable length between pulley 43 and the point of attachment 44 gradually increasing, and the length of the cable 41 between pulley 43 and the point of attachment 42, gradually decreasing.

It will thus be apparent that by virtue of the mechanism provided by our present invention, we are able to utilize the upward movement of the forward end of the trailer, which movement is effected by suitable power-actuated mechanism, for effectively drawing or pulling the rear wheels of the trailer toward the rear wheels of the tractor simultaneously with the elevation of the trailer body by said power-actuated mechanism. This compound movement of the trailer body permits the trailer body to be moved rapidly from its normal substantially horizontal position to its fully tilted or dumping position.

Upon the completion of the dumping operation, fluid-pressure is exhausted from the power-actuated jacks 25 and 26 and the weight of the trailer body becomes effective to lower the said body from its fully tilted, dumping position to its normal, substantially horizontal position. As the trailer body moves toward its normal position upon gradual relief of pressure within power jacks 25 and 26, the distance between pulley 38 and pulleys 13 and 14 gradually decreases, and the distance between pulleys 13 and 14 and the points of attachment of the cable ends at the near portion of the trailer body gradually increases, whereupon the rear wheels of the trailer body will move rearwardly and away from the rear wheels of the tractor. When the trailer body assumes its normal, substantially horizontal position, the forward end thereof will rest upon the upper edges of the members 9, 10 and 11, and the power actuated jacks 25 and 26 will assume a substantially horizontal position beneath the bottom of the trailer body as shown in dotted lines in Figure 1. Operation of the form of our invention shown in Figures 5, 6, and 7 insofar as relates to the completion of the dumping operation will, it is believed, be readily understandable from the foregoing description.

It is to be understood that the form of our present invention shown and described herein, is to be taken as a preferred embodiment of the same, and that various changes may be made in the shape, size and arrangement of parts without departing from the spirit of our invention or from the scope of te subjoined claims. For example, it is not essential to the successful operation of the tractor-trailer combination that the power-actuated jacks be of the fluid-pressure type, as other power-actuated elevating means such as a rack-and-pinion mechanism, could be used to effect the lifting or elevating of the forward end of the trailer body. The exact cable systems disclosed herein is subject to modification without departing from the scope of our present invention or from the scope of the subjoined claims. Various other changes will suggest themselves to one skilled in the art and need not be specifically enumerated herein.

Having thus described our invention, we claim:

1. In a dumping mechanism for semitrailers the combination of a tractor, a trailer, means connecting the front end portion of said trailer to the rear portion of said tractor and including power-actuated means extending between the front end portion of said trailer and the rear portion of said tractor and adapted when actuated to elevate the front end portion of said trailer vertically above said rear portion of said tractor to move said trailer to a tilted dumping position, a pulley means on the rear portion of said tractor, and flexible means comprising at least one cable connected at one end to the rear portion of said trailer, passing forwardly and under and around said pulley means and having its other end operatively connected to the front end portion of said trailer, whereby elevation of the front end of said trailer by said power-actuated means will simultaneously cause said flexible means to draw the rear portion of said trailer forwardly toward the rear portion of said tractor.

2. In a dumping mechanism for semitrailers the combination of a tractor, a trailer, means connecting the front end portion of said trailer to the rear portion of said tractor and including power-actuated means extending between the front end portion of said trailer and the rear portion of said tractor and adapted when actuated to elevate the front end portion of said trailer vertically above said rear portion of said tractor to move said trailer to a tilted dumping position, a pair of spaced pulleys on the rear portion of said tractor, a pulley on the front end portion of said trailer, and a cable having one end rigidly connected to the rear portion of said trailer, passing forwardly and under and around one of the pulleys on said tractor, passing upwardly and around the pulley on the front end portion of said trailer, passing downwardly and around and under the other of the pulleys on said tractor and passing rearwardly with its other end rigidly connected to the rear portion of said trailer, whereby elevation of the front end of said trailer by said power-actuated means will simultaneously cause said cable to draw the rear portion of said trailer forwardly toward the rear portion of said tractor.

3. In a dumping mechanism for semitrailers, the combination of a tractor, a substantially horizontally positioned disk-like member mounted at the rear end of said tractor, a second disk-like member rotatably mounted on the upper surface of said first disk-like member, a trailer, means connecting said second disk-like member to the front end portion of said trailer and including power-actuated means extending between said second disk-like member and the front end portion of said trailer and adapted when actuated to elevate the front end portion of said trailer vertically above the rear portion of said tractor to move said trailer to a tilted dumping position, a pulley mounted on said second disk-like member, and a cable having one end rigidly connected to the rear portion of said trailer, passing forwardly and under and around said pulley and having its other end connected to the front end portion of said trailer, whereby elevation of the front end of said trailer by said power-actuated means will simultaneously cause said cable to draw the rear portion of said trailer forwardly toward the rear portion of said tractor.

4. In a dumping mechanism for semitrailers, the combination of a tractor, a substantially horizontally positioned disk-like member mounted at the rear end of said tractor, a second disk-like member rotatably mounted on the upper surface of said first disk-like member, a trailer, means connecting said second disk-like member to the front end portion of said trailer and including power-actuated means extending between said second disk-like member and the front end portion of said trailer and adapted when actuated to elevate the front end portion of said trailer vertically above the rear portion of said tractor to move said trailer to a tilted dumping position, a pair of spaced pulleys mounted on said second disk-like member, a pulley on the front end portion of said trailer, and a cable having one end rigidly connected to the rear portion of said trailer, passing forwardly and under and around one of the pulleys on said second disk-like member, passing upwardly and around the pulley on the front end portion of said trailer, passing downwardly and around and under the other of the pulleys on said second disk-like member, and passing rearwardly with its other end rigidly connected to the rear portion of said trailer, whereby elevation of the front end of said trailer by said power-actuated means will simultaneously cause said cable to draw the rear portion of said trailer forwardly toward the rear portion of said tractor.

5. In a dumping mechanism for semitrailers, the combination of a tractor, a trailer, a substantially horizontally positioned disk-like member mounted at the rear end of said tractor, a second disk-like member rotatably mounted on the upper surface of said front disk-like member, a trailer, means connecting said second disk-like member to the front end portion of said trailer and including extensible, power-actuated means having its lower end pivotally mounted on said second disk-like member and its upper end pivotally connected to the front end portion of said trailer, extension of said extensible power-actuated means elevating the front end portion of said trailer vertically above said second disk-like member to move said trailer to a tilted dumping position, a pulley on said tractor, and a cable having one end rigidly connected to the rear portion of said trailer, passing forwardly and under and around said pulley and passing upwardly with its other end connected to the front end portion of said trailer, whereby elevation of the front end of said trailer by said extensible, power-actuated means will simultaneously cause said cable to draw the rear portion of said trailer forwardly toward the rear portion of said tractor.

6. In a dumping mechanism for semitrailers, the combination of a tractor, a substantially horizontally positioned disk-like member mounted on the rear end of said tractor, an elongated member on the upper surface of said disk-like member, a pulley rotatably mounted on said elongated member, a trailer, means connecting the front end portion of said trailer to the rear portion of said tractor and adapted when actuated to elevate the front end portion of said trailer vertically above said disk-like member to move said trailer to a tilted dumping position, and a cable having one end rigidly connected to the rear portion of said trailer, passing forwardly and under and around said pulley and passing upwardly with its other end connected to the front end portion of said trailer, whereby elevation of the front end of said trailer by said power-actuated means will simultaneously cause said cable to draw the rear portion of said trailer forwardly toward the rear portion of said tractor, the forward end portion of said trailer when the same is in its normal horizontal position resting upon the upper surface of said elongated member.

7. In a dumping mechanism for semitrailers, the combination of a tractor, a substantially horizontally positioned disk-like member mounted on the rear end of said tractor, a pair of elongated members arranged in parallel spaced relation on the upper surface of said disk-like member, a pair of pulleys one rotatably mounted on each of said elongated members, a trailer, a pulley mounted on the front end portion of said trailer, power-actuated means connecting the front end portion of said trailer to the rear portion of said tractor and adapted when actuated to elevate the front end portion of said trailer vertically above said disk-like member to a tilted dumping position, and a cable having one end rigidly connected to the rear portion of said trailer, passing forwardly and under and around one of the pulleys on one of said elongated members, passing upwardly and around the pulley on the front end portion of said trailer, passing downwardly and around and under the other of the pulleys on the other of said elongated members, and passing rearwardly with its other end rigidly connected to the rear portion of said trailer, whereby elevation of the front end of said trailer by said power-actuated means will simultaneously cause said cable to draw the rear portion of said trailer forwardly toward the rear portion of said tractor, the forward end portion of said trailer when the same is in its normal horizontal position resting upon the upper surfaces of said elongated members.

References Cited in the file of this patent
UNITED STATES PATENTS

| | | |
|---|---|---|
| 2,495,354 | Spearing et al. | Jan. 24, 1950 |
| 2,628,126 | Black | Feb. 10, 1953 |